United States Patent Office 3,509,559
Patented Apr. 28, 1970

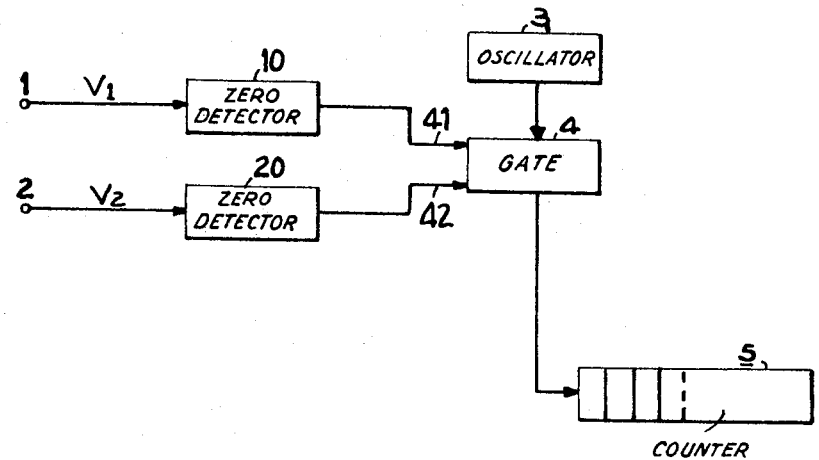
FIG_1
PRIOR ART
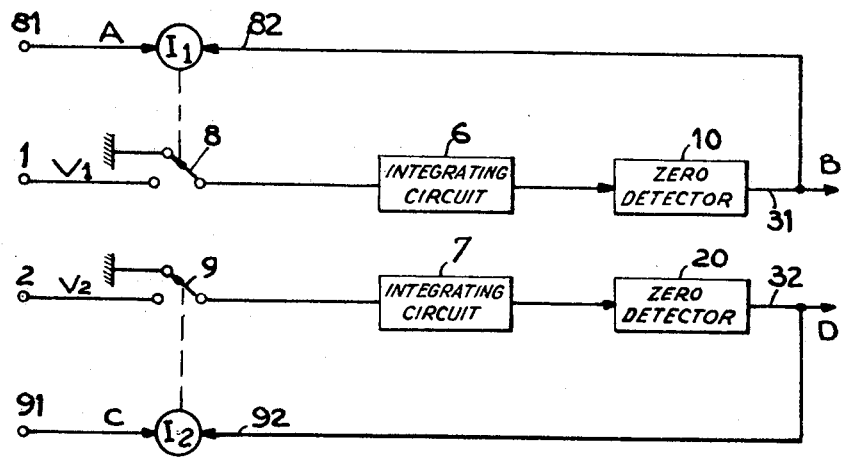
FIG_2

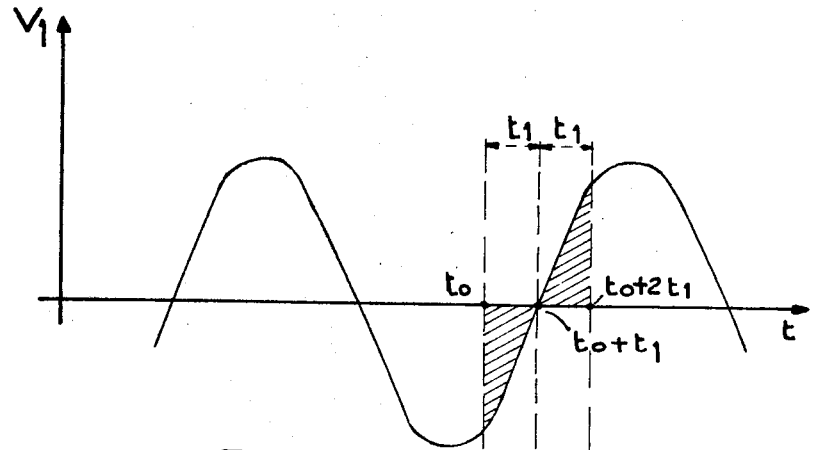
FIG_3
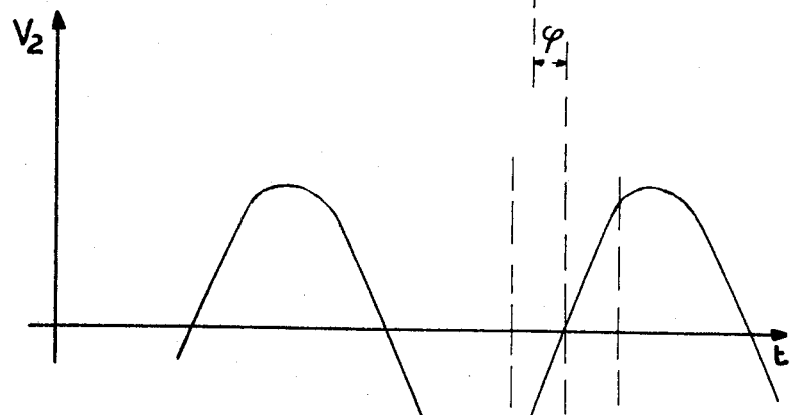
FIG_4
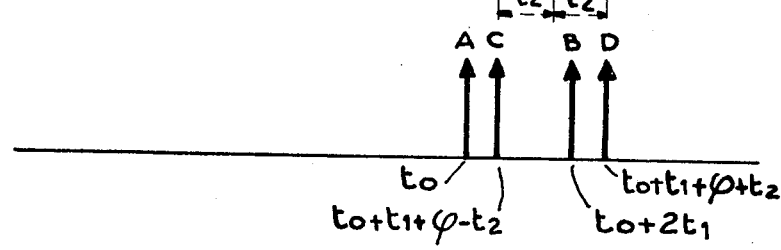
FIG_5

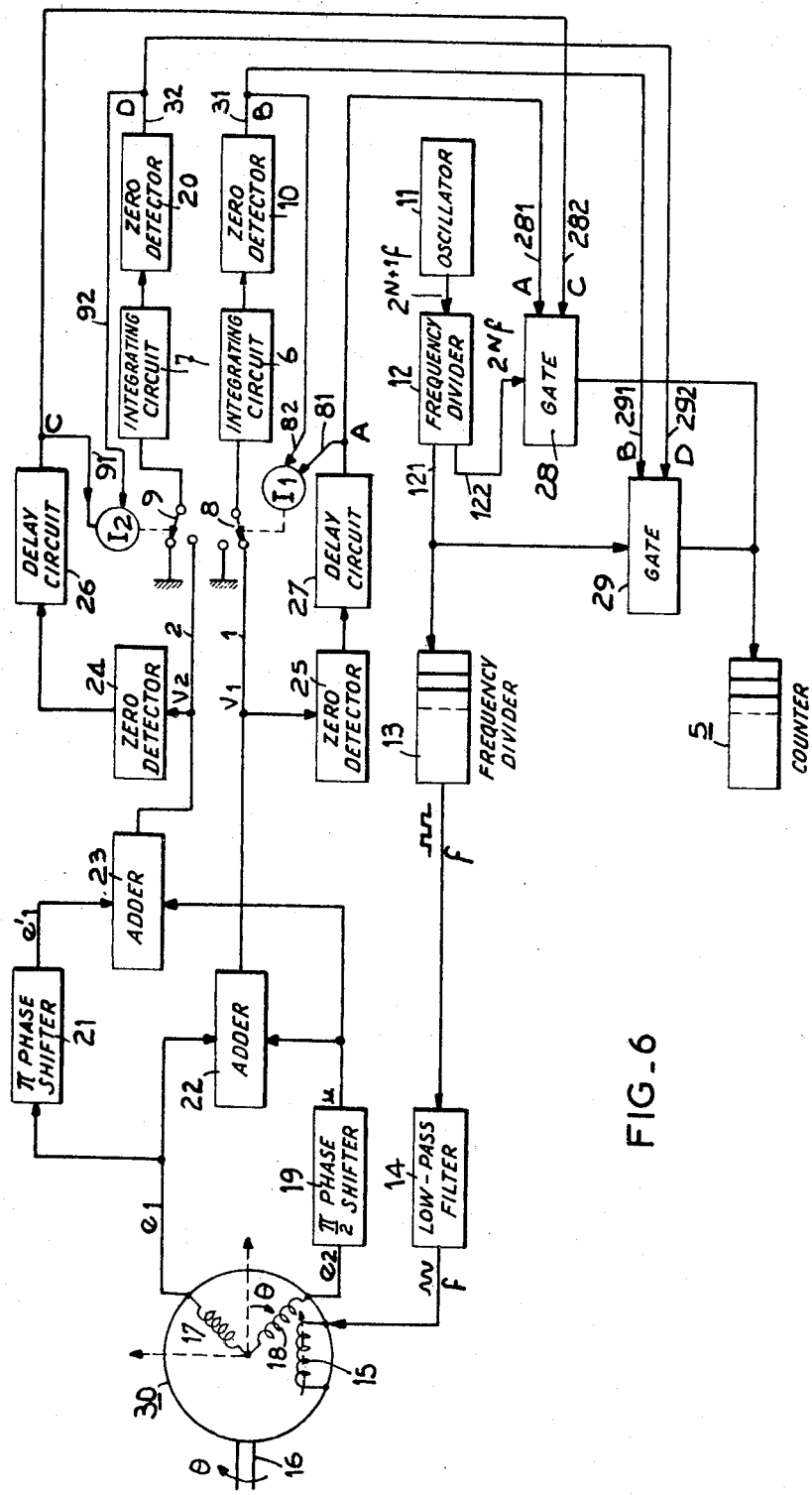
FIG._6

3,509,559
PHASE SHIFT CODING SYSTEM
Guy Leconte, Paris, France, assignor to CSF-Compagnie Generale de Telegraphie Sans Fil, a corporation of France
Filed June 24, 1966, Ser. No. 560,253
Claims priority, application France, June 29, 1965, 22,671
Int. Cl. H03k 13/02
U.S. Cl. 340—347           8 Claims

ABSTRACT OF THE DISCLOSURE

A phase shift coding system for coding the phase shift between two alternating voltages of the same frequency comprising circuit means for determining by integration two intervals of time equally extending on both sides respectively of the corresponding passages through zero of these voltages and for generating pulses respectively bounding these time intervals. A counter is connected to a clock by means of gates controlled by these pulses for said counter to count clock pulses, on one hand, between the beginnings of these time intervals and, on the other hand, between the ends of these time intervals.

---

The present invention relates to the numerical coding of a phase shift between two alternating voltages of the same frequency.

It is already known to detect to this end the passage through zero of each of these two voltages. The first zero detector supplies a pulse which permits the opening of a gate circuit when the first voltage passes through zero. The gate circuit then supplies to a counter pulses at a constant frequency. A second zero detector supplies subsequently a pulse which closes the gate circuit when the second voltage passes through zero. The counter has thus counted the pulses during the time interval separating the respective passages through zero of the two voltages. The number of pulses which have been counted is therefore proportional to the phase shift between the two voltages. The method normally employed for detecting the zero (i.e. a method using differential amplifiers with one input connected to a reference zero potential) results in a substantial amplification of the voltages concerned, near the zero amplitude, and thus in a considerable amplification of the noise and of the harmonics which may be a source of error in the determination of the instant of the passage through zero.

This sensitivity to noise is due to the fact that the measurement of the phase shift is effected by sampling voltages during a very short time interval, at the instant of their passage through zero.

It is an object of the invention to avoid these drawbacks while at the same time increasing the sampling time by effecting an integration over a more or less substantial fraction of the period of the voltages whose relative phase shift is being coded.

According to the invention there is provided a numerical coding system for coding the phase shift between two alternating voltages of the same frequency. This system comprises means for determining two intervals of time extending respectively on both sides of corresponding passages through zero of these voltages, each interval of time equally extending on both sides of the passage through zero of the associated voltages. A counter is controlled by these means to count clock pulses, on one hand, between the beginnings of these time intervals, and, on the other hand, between the ends of these time intervals. The resulting count in the counter, which is the sum of these two counts, is a digtal measure of the phase shift between the alternating voltages, this measure being independent of the precision of determination of these time intervals.

For a better understanding of the invention and to show how the same may be carried into effect reference will be made to the drawings accompanying the following description and in which:

FIG. 1 is a block diagram of a conventional circuit for coding the phase shift between two voltages;

FIG. 2 shows diagrammatically that part of the system according to the invention which supplies the counting control pulses;

FIGS. 3, 4 and 5 are graphs showing as a function of time the voltages whose relative phase shift is being coded and the counting control pulses; and FIG. 6 is a block diagram of an embodiment of an analogue-to-digital converter which codes in binary form the angular position of a rotating shaft, and which uses an arrangement according to the invention.

FIG. 1 shows a conventional arrangement for coding the phase shift between two voltages. Two alternating voltages $V_1$ and $V_2$ with the same frequency $f$ are applied, respectively, to inputs 1 and 2. These inputs are connected to two zero detector circuits 10 and 20, whose outputs are respectively connected to the control inputs 41 and 42 of a gating circuit 4. Circuit 4 is located between an oscillator 3, with a repetition frequency $2^N f$, and a binary counter 5. During the passage through zero of the voltage $V_1$ while the latter rises, the detector 10 applies to the input 41 of the gate circuit 4 an opening pulse, thus enabling the counter 5 to count pulses at the frequency $2^N f$.

When the voltage $V_2$ passes in turn through zero while it rises, the detector 20 supplies a closing pulse to the input 42 of the gate circuit 4 causing the counter 5 to stop counting. This counter has thus counted a number of pulses which is proportional to the time interval separating the passages through zero of the two voltages $V_1$ and $V_2$ and therefore proportional to the phase shift $\varphi$ between the two voltages.

FIG. 2 shows a block diagram of that part of the arrangement according to the invention which supplies the counting control pulses. The voltages $V_1$ and $V_2$, which are phase shifted by $\varphi$ with respect to each other are applied to inputs 1 and 2, which are respectively connected to a first terminal of switches $I_1$ and $I_2$.

The moving contact 8 of the switch $I_1$ is connected to an integrating circuit 6, connected to a zero detector 10. The switch $I_1$ has two control inputs 81 and 82, the input 82 being connected to the output of the detector 10.

Similarly the moving contact 9 of the switch $I_2$ is connected to an integrating circuit 7 which is itself connected to a zero detector circuit 20.

The switch $I^2$ has two control inputs 91 and 92; the input 92 is connected to the output of the detector 20.

Outside the measuring periods, the inputs of the integrators 6 and 7 are both connected to the reference zero potential through the switches $I_1$ and $I_2$, as shown in the drawing.

For a better understanding of the operation of the system, reference will be made to the explanatory curves of FIGS. 3, 4 and 5.

At an instant $t_0$, preceding by $t_1$ the passage through zero of the voltage $V_1$ while it increases, a control pulse A is applied to the control input 81 of the switch $I_1$ and puts it in a position in which voltage $V_1$ is applied to the input of the integrator 6.

The output voltage integrated by the integrator 6, which is zero at the moment $t_0$, rises, passes through a maximum at the moment $t_0+t_1$ corresponding to the passage of the voltage $V_1$ through zero, then decreases and vanishes at the moment $t_0+2t_1$. At the moment when the integrated output signal of the integrator 6 disappears, the zero detector 10 supplies a pulse B. This pulse is applied to the input 82 of the switch $I_1$ which disconnects the voltage $V_1$ from the input of the integrator 6.

A similar sequence of operations is applied to the voltage $V_2$. A pulse C is produced at the moment $$(t_0+t'_1+\varphi)-t_2$$

preceding by $t_2$ the passage through zero of the voltage $V_2$ while it increases. This pulse actuates, through the input 91, the switch $I_2$ which connects the voltage $V_2$ to the input of the integrator 7. The voltage supplied by the integrator 7 disappears at the moment $t'_0+t_1+\varphi+t_2$. The zero detector 20 supplies then a pulse D which actuates the switch $I_2$, thus disconnecting the voltage $V_2$ from the input of the integrator 7. The pulses A, B, C and D are used for controlling the opening and closing of gate circuits so that a counter (not shown) receives pulses only during the intervals of time separating the pulses A and C on the one hand and B and D on the other hand. The total counting time $\tau$ of the counter is therefore:

$$\tau=(t_0+t_1+\varphi-t_2)-t'_0+(t_0+t_1+\varphi+t_2)-(t_0+2t_1)=2\varphi$$

The number of pulses counted by the counter is therefore proportional to $\varphi$. This number is indepedent of the instants at which the integration of the voltages $V_1$ and $V_2$ started, since $\tau$ is independent of $t_0$, $t_1$ and $t_2$. The values of $t_0$, $t_1$ and $t_2$ are therefore not critical.

If $\tau$ is, in the system according to the invention, the error in the integration time of one of the voltages $V_1$ or $V_2$ due to a parasitic disturbance and $\tau_0$ is the error in determining the instant of the passage of the same voltage through zero due to the same disturbance in a conventional system, such as shown in FIG. 1, it is possible to define a factor $m$ which is the ratio between the respective errors, in determining $\varphi$, in the conventional system and in the system according to the invention, with $$m=2\tau_0/\tau$$

the error $\tau$ being made in determining $2\varphi$ and the error $\tau_0$ being made in determining $\varphi$. The factor $m$ is characteristic of the improvement of the system according to the invention compared with the conventional system.

In the case where harmonics are present for example in the voltage $V_1$, it may be shown that:

$$m=n\frac{\sin \omega t_1}{\sin n\omega t_1}$$

wherein $n$ is the order of the harmonic considered and $\omega$ is the angular frequency of the voltages $V_1$ and $V_2$.

Therefore, it is found that if $t_1=T/4$, T being the period of the alternating voltages $V_1$ and $V_2$, the effects of even harmonics are eliminated and the effect of odd harmonics is divided by the order number $n$ of the harmonic considered. If $t_1=T/6$, the effects of the harmonics of the order 3, 6, 9 etc. are eliminated and the effects of the other harmonics are divided by $n$.

In another embodiment of the invention the same method of integration can be used twice, once about the passage through zero while the values of $V_1$ and $V_2$ rise and once about the passage through zero while those values decline. One obtains in this case, in the presence of harmonics, an improvement factor $m$ given by $$m=n\frac{\sin \omega t_1}{\sin n\omega t_1}\times\frac{1}{\sin n\frac{\pi}{2}}$$

Thus, even harmonics are always eliminated. In addition there is an improvement of the filtering on either side of $\omega$.

FIG. 6 shows an analogue - to - numerical converter which provides a binary coding of the angular position of a rotating shaft and which embodies an arrangement according to the invention. The same reference numerals indicate the same elements as in FIG. 2. An oscillator 11 having a frequency $2^{N+1}f$ is connected to a frequency divider circuit 12 which divides the frequency by 2, and provides at its outputs 121 and 122 pulses with a frequency $2^Nf$, offset with respect to each other by half a period. These outputs 121 and 122 are respectively connected to gate circuits 29 and 28 having respective outputs connected to an input of a binary counter 5 having a counting capacity $2^N$. The output 121 of the circuit 12 is also connected to a frequency divider 13 which divides the frequency by $2^N$. The output of the divider 13 is connected to a low-pass filter 14 which provides a sinusoidal voltage with the frequency $f$. The latter is applied to the stator winding 15 of a resolver 30. The rotor of this resolver is driven by a shaft 16 and carries windings 17 and 18. The angle $\theta$ defines the position of the rotor with respect to a reference axis. The winding 18 supplies a voltage $e_2$, which is applied to a phase shifter circuit 19 providing a phase shift by $\pi/2$. The voltage $u$ obtained at the output is applied to two adder circuits 22 and 23. The winding 17 supplies a voltage $e_1$ applied to the adder 22 and, through a phase shifter 21 providing a phase shift by $\pi$, to the adder 23. The adder 22 supplies a voltage $V_1$ applied to the input 1 of the arrangement according to the invention as shown in FIG. 2, and the adder 23 supplies a voltage $V_2$ applied to the input 2 of the same arrangement. The voltage $V_1$ is also applied to a zero detector 25 which detects the passage through zero, while the value of the voltage declines and which is connected to a delay circuit 27. The output of the circuit 27 is connected to the input 81 of the switch $I_1$ and to the control input 281 of the gate circuit 28.

Similarly, the voltage $V_2$ is connected to a zero detector 26 which detects the passage through zero while the values of the voltage declines and is connected to a delay circuit 26. The output of the circuit 26 is connected to the input 91 of the switch $I_2$ and to the control input 282 of the gate circuit 28. The output 31 of the arrangement according to the invention as shown in FIG. 2 is connected to the control input 291 of the gate circuit 29 and the output 32 is connected to the input 292 of the circuit 29.

The operation of the system shown in FIG. 6 is as follows: The winding 15 of the resolver 30 is supplied with a sinusoidal voltage with an angular frequency $\omega=2\pi f$. The rotor windings 17 and 18 supply respectively voltage $$e_1=E \sin \omega t \sin \theta$$

$$e_2=E \sin \omega t \cos \theta$$

The phase shifter 21 supplies a voltage $e'_1=-e_1$ and the phase shifter 19 supplies a voltage $$u=E \cos \omega t \cos \theta$$

The adder circuit 22 gives a voltage $V_1$, which is the sum of the voltages $e_1$ and $u$:

$$V_1=E \cos (\omega t-\theta)$$

The adder circuit 23 gives a voltage $V_2$ which is the sum of the voltages $e'_1$ and $u$:

$$V_2=E \cos (\omega t+\theta)$$

The phase shift between these two voltages is therefore equal to $2\theta$. The zero detector 25 supplies a pulse A' at the moment of the passage of voltage $V_1$ through zero by decreasing values. This pulse A' is delayed by the amount desired by the circuit 27 (for example by $T/4$ if it is desired to have an integration time of $V_1$ equal to $T/2$). The circuit 27 supplies the pulse referred to above as pulse A. On the same manner the circuits 24 and 26 supply the pulse C. The arrangement formed by the switches $I_1$ and $I_2$, the integrators 6 and 7 and the zero detectors 10 and 20 operates as described above. The pulses B and D are obtained from the outputs 31 and 32.

The counter 5 counts the pulses at the frequency $2^Nf$ during the time intervals separating the pulses A and C, by means of the gate 28, and the pulses B and D, by means of the gate 29.

The number of pulses counted by the counter 5 is proportioned to the phase shift between the voltages $V_1$ and $V_2$, and supplies therefore the coded value of the angle $\theta$.

The gate circuits 28 and 29 receive the pulses at the frequency $2^N f$, which are shifted by half a period in such a way that if the intervals AC and BD partially overlap, the counter 5 counts a double number of pulses for the time of this overlap.

The embodiments hereinbefore described are by no way limitative and the invention may be modified in many ways without thereby departing from the scope of the invention. In particular the arrangement according to the invention may be applied to phase meters operating by counting.

What is claimed is:

1. A numerical coding system for coding the phase shift between a first and a second alternating voltage of the same frequency, $f=1/T$, T being the period of said voltages, said coding system comprising: first means for determining a first interval of time equally extending on both sides of a passage of said first voltage through zero; second means for determining a second interval of time equally extending on both sides of the corresponding passage of said second voltage through zero; a pulse generator supplying pulses at a constant frequency; and counting means controlled by said first and second means for counting the sum of the numbers of pulses generated by said generator respectively during the time interval extending between the respective beginnings of said first and second time intervals and during the time interval extending between the respective ends of said first and second time intervals.

2. A coding system as claimed in claim 1, wherein said first means comprise means for generating a pulse A at a moment preceding by a time interval $t_1$, lower than $T/2$, the passage of said first voltage through zero and means for generating a pulse B at a moment delayed by a time interval $t_1$ with respect to said passage of said first voltage through zero and wherein said second means comprise means for generating a pulse C at a moment preceding by a time interval $t_2$, lower than $T/2$, the corresponding passage of said second voltage through zero and means for generating a pulse D at a moment delayed by a time interval $t_2$ with respect to said passage of said second voltage through zero.

3. A coding system as claimed in claim 2, wherein said pulse generator has two outputs supplying pulses at a frequency F, said pulses at said two outputs being shifted with respect to each other by half a period of said pulses, and wherein said counting means comprise a pulse counter and a first and a second gate, respectively connected between said outputs of said generator and said counter and respectively controlled by said pulses A and C and said pulses B and D, for allowing said counter to count said pulses at said frequency F during the time intervals extending respectively between said pulses A and C and said pulses B and D.

4. A coding system as claimed in claim 3, wherein said means for generating a pulse A comprise a first zero detector for generating a pulse A′ upon a passage of said first voltage through zero and a delay circuit connected to said first zero detector for delaying said pulse A′ by a time interval $$\frac{T}{2}-t_1$$

and wherein said means for generating a pulse C comprise a second zero detector for generating a pulse C′ upon the corresponding passage of said second voltage through zero and a delay circuit connected to said second zero detector for delaying said pulse C′ by a time $$\frac{T}{2}-t_2$$

5. A coding system as claimed in claim 4, wherein said means for generating a pulse A comprise a zero detector for generating a pulse A′ upon a passage of said first voltage through zero in a negative direction and a delay circuit connected to said zero detector for delaying said pulse A′ by a time $$\frac{T}{2}-t_1$$

and wherein said means for generating a pulse C comprise a second zero detector for generating a pulse C′ upon the corresponding passage of said second voltage through zero in a negative direction and a delay circuit connected to said second zero detector for delaying said pulse C′ by a time $$\frac{T}{2}-t_2$$

6. A coding system as claimed in claim 5, wherein said means for generating a pulse B comprise a first integrating circuit having an integrated voltage output, a third zero detector connected to said integrated voltage output for generating said pulse B upon the passage of said integrated voltage through zero and a first switch controlled by said pulses A and B for applying said first voltage, during the time extending between said pulses A and B, to said first integrating circuit and wherein said means for generating a pulse D comprise a second integrating circuit having an integrated voltage output, a fourth zero detector connected to said integrated voltage output of said second integrating circuit for generating said pulse D upon the passage of said integrated voltage supplied by said second integrating circuit through zero and a second switch controlled by said pulses C and D for applying said second voltage, during the time extending between said pulses C and D, to said second integrating circuit.

7. A phase shift numerical coding system as claimed in claim 6, wherein said frequency F is equal to $2^N f$, $2^N$ being the counting capacity of said counter.

8. A phase shift numerical coding system as claimed in claim 7, wherein $t_1=t_2=T/4$.

References Cited

UNITED STATES PATENTS 3,092,718  6/1963  Wullert _____ 340—347

MAYNARD R. WILBUR, Primary Examiner

J. GLASSMAN, Assistant Examiner